(12) United States Patent
Yeh et al.

(10) Patent No.: US 9,075,456 B2
(45) Date of Patent: Jul. 7, 2015

(54) TOUCH SENSING ELECTRODE STRUCTURE

(71) Applicant: J TOUCH CORPORATION, Taoyuan County (TW)

(72) Inventors: Yu-Chou Yeh, Taoyuan County (TW); Tzu Chun Tai, Taoyuan County (TW); Tsung-Her Yeh, New Taipei (TW)

(73) Assignee: J TOUCH CORPORATION, Taoyuan County (TW)

( * ) Notice: Subject to any disclaimer, the term of this patent is extended or adjusted under 35 U.S.C. 154(b) by 142 days.

(21) Appl. No.: 13/867,087

(22) Filed: Apr. 21, 2013

(65) Prior Publication Data

US 2014/0267947 A1 Sep. 18, 2014

(30) Foreign Application Priority Data

Mar. 18, 2013 (TW) .............................. 102109469 A

(51) Int. Cl.
*G06F 3/0354* (2013.01)
(52) U.S. Cl.
CPC .................................. *G06F 3/03547* (2013.01)
(58) Field of Classification Search
CPC ....... B32B 15/02; G06F 3/044; G06F 3/0412; G06F 3/041; G06F 2203/04103; G06F 2203/04111; G06F 2203/04112; G06F 3/03547
USPC ........................................................ 345/174
See application file for complete search history.

(56) References Cited

U.S. PATENT DOCUMENTS

| | | | |
|---|---|---|---|
| 2009/0002337 A1* | 1/2009 | Chang ........................... | 345/174 |
| 2009/0159344 A1* | 6/2009 | Hotelling et al. ........... | 178/18.06 |
| 2009/0273570 A1* | 11/2009 | Degner et al. ................. | 345/173 |

FOREIGN PATENT DOCUMENTS

| | | |
|---|---|---|
| CN | 102262925 | 11/2011 |
| JP | 2009009574 A | 1/2009 |
| JP | 2012103761 A | 5/2012 |
| TW | I346297 | 8/2011 |

* cited by examiner

*Primary Examiner* — Charles V Hicks
*Assistant Examiner* — Charles Zheng
(74) *Attorney, Agent, or Firm* — Li & Cai Intellectual Property (USA) Office

(57) ABSTRACT

Present disclosure is related to a touch sensing electrode structure. The structure includes multiple first electrode lines formed along a first direction spaced from each other. Each first electrode line has several first electrode blocks which are electrically connected with a space there-between. The structure also includes multiple second electrode lines along a second direction spaced from each other. The second electrode lines and the first electrode lines are overlapped and insulated. The second electrode line also includes several second electrode blocks which are electrically connected with a space. The every first or second electrode block has a plurality of second wires formed along the second direction and at least one first wire which is electrically connected with the second wires and formed along the first direction.

7 Claims, 7 Drawing Sheets

TOUCH SENSING ELECTRODE STRUCTURE

BACKGROUND

1. Technical Field

The present invention is related to a touch sensing electrode structure; in particular, it's related to the sensing electrode structure applied to a touch panel.

2. Description of Related Art

A general touch panel adopts one or two layers of electrode plates for the purpose of sensing touching positions. In the conventional technologies, many multi-layer electrode structures have been developed. For example, a capacitance-type touch panel uses the electrodes to sense the capacitive change caused by static electricity when a touching event is made by a user's finger. By which the coordinate positions upon the touch panel can be determined by the electrodes over different directions.

To the electrode materials, it is such as the transparent conductive film made of Indium Tin Oxides (ITO). The demand for large-size touch panel currently requires metal lines to be the electrode structure. The metal lines are such as gold, silver, copper or the like. Through the metal electrode structure of the touch panel, it is achieved that the change of capacitance and the corresponding current over the electrodes may be used to judge the touching positions. In other words, the touching event may result in voltage difference in the coupled capacitors along the sensing electrodes over different directions, and therefore the touching position can be found.

FIG. 1 schematically shows the electrode structure of the conventional technology which is made to technology disclosed in CN102262925 (published on Nov. 30, 2011). The shown electrode structure in a touch panel includes two layers, which are such as a first electrode layer 11 and a second electrode layer 12 with different axial directions. The two electrode layers provide two kinds of axial electrode signals over vertical and horizontal directions respectively.

The electrode structure shown in FIG. 1 is made of fine metal lines. The every metal line winds, turns and cross-connects with each other. According to the disclosure, the every electrode layer forms two or more big lattices along different directions. For example, two or more big lattices are formed over every axial direction. The every big lattice is formed by two or more small lattices. It is noted that some auxiliary patterns are formed next to, but not connected to, the other latters around the edges of the first big lattice. The small latters are the smallest squares. The interconnected and cross-connected metal lines form the electrode structure, and serve to ensure accuracy of sensing the touch-sensing events for avoiding poor sensing caused by any broken line according to one major objective.

The patterns of big lattices over the first electrode layer 11 and the second electrode layer 12 are complementary. There are not too many overlapped portions when the structure overlaps with others. The touching position can be obtained when the signals over the two directions within an area are simultaneously generated with any touching event triggered over the touch panel.

FIG. 2 shows the electrode structure in one touch panel in one other conventional technology. This example is disclosed in TW I346297 (published on Aug. 01, 2011). The described touch panel shows a plate layer 2. On its two surfaces the electrodes over two different directions are formed. The figure shows orthogonal first electrode 21 and second electrode 22. This plate layer 2 is simultaneously to be a partition for isolating the two electrode plates.

A controller 23 is disposed to connect with the first electrode 21 與 and the second electrode 22. This controller 23 powers the electrode sets (21, 22). An electric field is therefore formed between the first electrode 21 and the second electrode 22. The patterns formed on the first electrode 21 and the second electrode 22 are the latticed metal lines which are in-series connected with each other. These connected latticed metal lines are used to enhance the conductivity of the touch panel.

The mentioned reticular and latticed metal lines forming the patterns on the different types of electrode blocks according to the conventional technologies are to enhance the conductivity of the touch panel and also provide higher accuracy. However, the mentioned reticular or latticed electrode blocks may result in poor quality of a display because the patterns may reduce transmittance of the touch panel and shelter displayed image. Furthermore, the manufacturing process will be much complex since the patterns of reticular or latticed electrode blocks are complicated. Also, the conventional technologies may cost high because the complex patterns needs much more conductive materials.

SUMMARY

To enhance touching sensitivity and accuracy of a touch panel, and also with high transparency, disclosure is related to touch sensing electrode structure. It is worth noting that the touch sensing electrode structure is provided for effectively preventing optical interference stripes caused by the electrode patterns. The structure also advantages the product to reduce cost.

In an exemplary embodiment, the electrode structure includes a plurality of first electrode lines and second electrode lines. The first electrode lines are formed along a first direction and spaced from each other. The each first electrode line includes multiple first electrode blocks which are electrically interconnected and spaced at intervals. Also, the multiple second electrode lines are disposed along a second direction and spaced from each other. The second electrode lines are insulated from and overlapped with the first electrode lines. The each second electrode line includes multiple electrically-connected second electrode blocks which are spaced at intervals.

In one embodiment of the invention, both the first electrode block and the second electrode block include a plurality of second wires spaced from each other along the second direction, and at least one first wire electrically connected with the second wires along the first direction.

Further, according to one of the embodiments, the first electrode lines, the second electrode lines, the first wires and the second wires are atilt disposed relative to a horizontal direction. The every first electrode line further includes multiple third wires which electrically connect with the first wires of the adjacent first electrode blocks. The second electrode line also includes multiple fourth wires that electrically connect with the second wires between the adjacent second electrode blocks.

Furthermore, the described first electrode block and the second electrode block may be formed with some other geometric contours such as rhombic or hexagonal.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided

DESCRIPTION OF THE EXEMPLARY EMBODIMENTS

Figure 1:
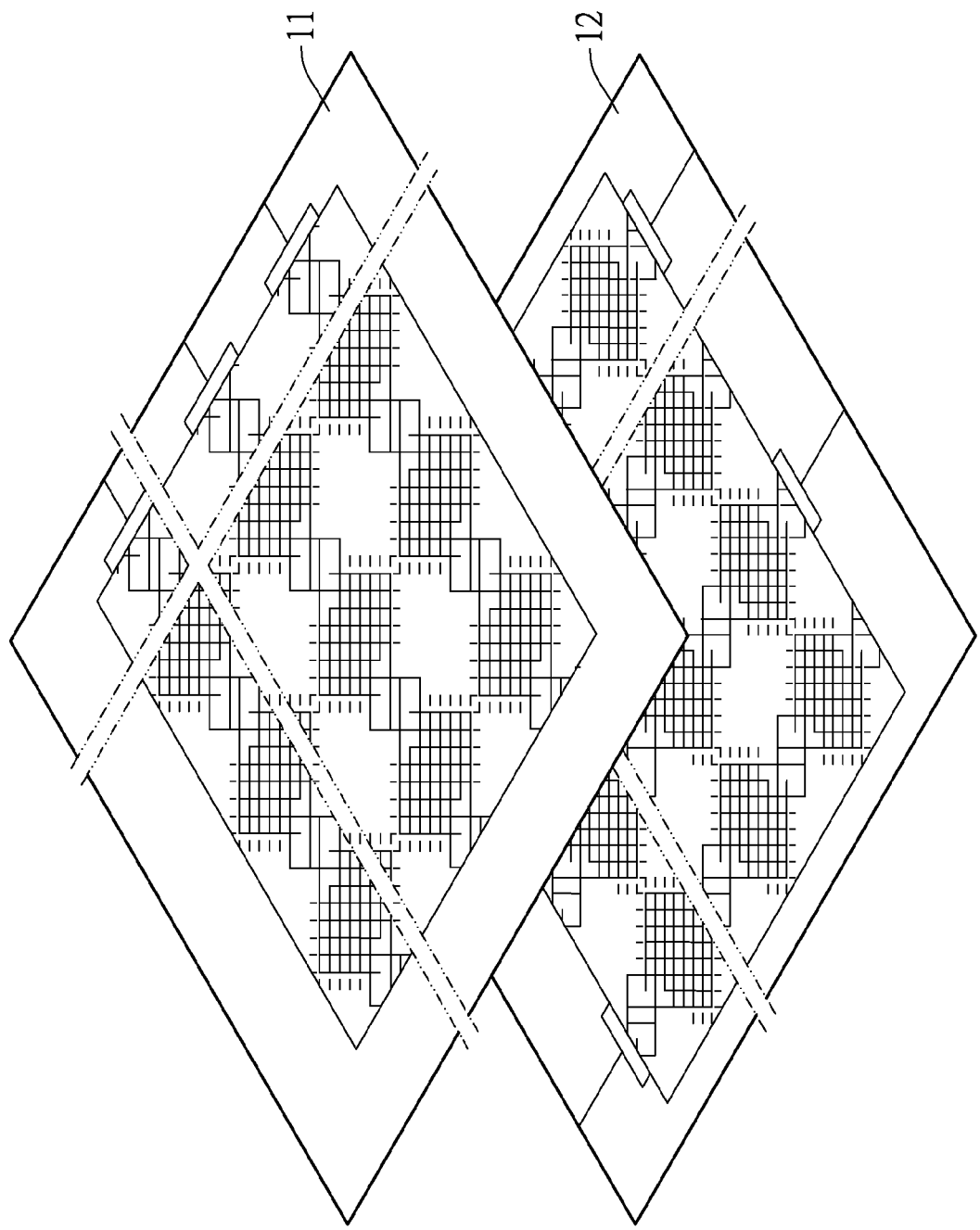
FIG. 1 shows the electrode structure applied to the touch panel of one of the conventional technologies.
Figure 2:
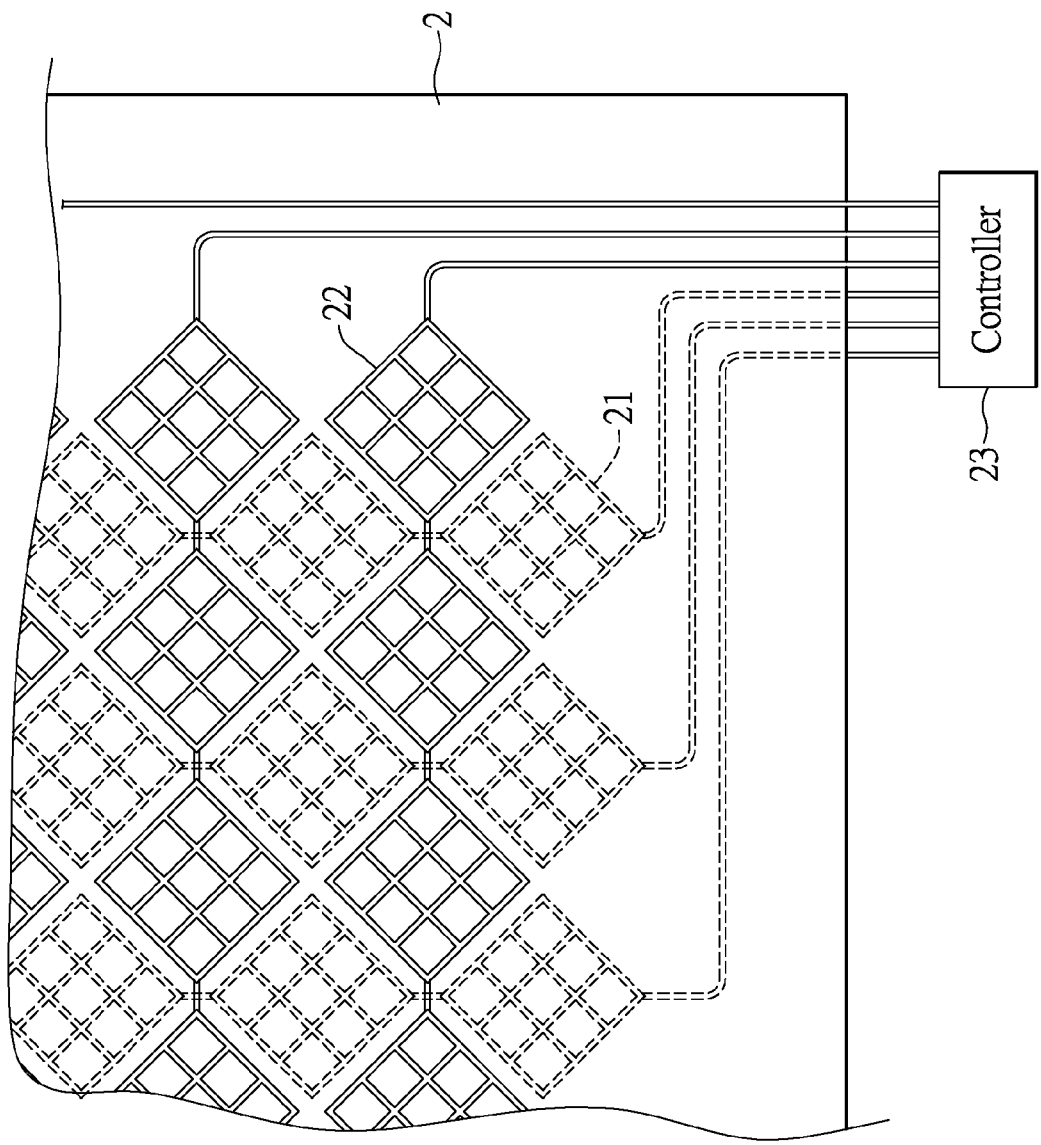
FIG. 2 shows the electrode structure in touch panel in one of the conventional technologies.

Reference will now be made in detail to the exemplary embodiments of the present disclosure, examples of which are illustrated in the accompanying drawings. Wherever possible, the same reference numbers are used in the drawings and the description to refer to the same or like parts.

Figure 3A:
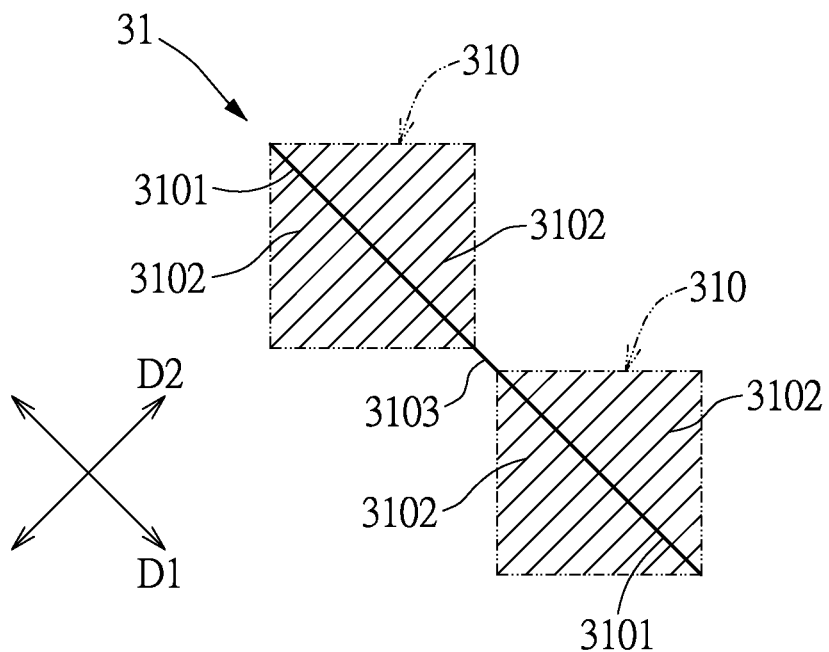
FIG. 3A schematically shows a first electrode line of the touch sensing electrode structure in one embodiment of the present invention.

According to one of the embodiment of the present invention, disclosed is to a touch sensing electrode structure that is applicable to a touch panel, especially to medium or large-sized touch panel. Reference is made to FIG. 3A which schematically describes a first electrode line of the touch sensing electrode structure. Corresponding to the shown directional axes D1, D2, the wires 3101, 3102 are formed in the first electrode block 310 of the first electrode line 31. According to one exemplary embodiment, the shown first direction ("D1") and second direction ("D2") are not parallel, for example, D1 and D2 may be substantially perpendicular to one another.

FIG. 3A also shows the first electrode line 31 including multiple first electrode blocks 310 which are electrically interconnected and spaced at intervals. The first electrode block 310 includes multiple second wires 3102 which are spaced at intervals along the second direction (D2), and at least one first wire 3101 which is electrically connected with the second wire 3102 along the first direction (D1). In the present embodiment, the second wires 3102 are parallel at intervals. However, the invention is not limited to the present embodiment.

As the figure describes, the first electrode line 31 further includes third wires 3103. The one third wire 3103 is electrically connected with the first wires 3101 of the two adjacent first electrode blocks 310. Therefore, the two adjacent first electrode blocks 310 are conducted. It is noted that the first electrode block 310 preferably has rhombic or hexagonal (not shown) geometric contour.

Figure 3B:
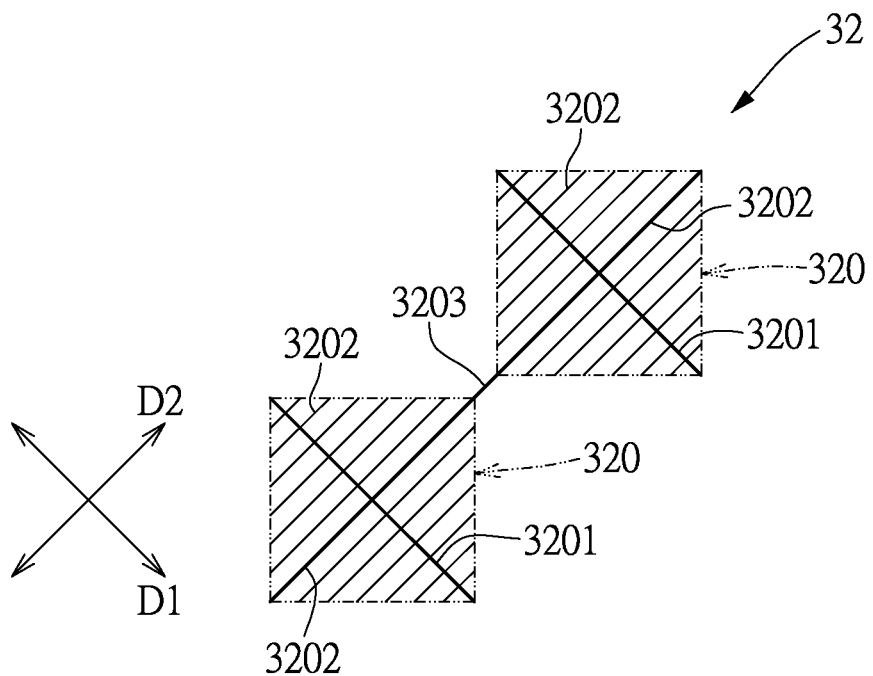
FIG. 3B schematically shows a second electrode line of the touch sensing electrode structure in one embodiment of the present invention.

Next, FIG. 3B schematically shows the second electrode line of the touch sensing electrode structure according to one embodiment. It is shown that the second electrode line 32 differs from the first electrode line 31 in the direction they are formed.

FIG. 3B shows the second electrode line 32 including multiple second electrode blocks 320 which are electrically connected and spaced at intervals. The each second electrode block 320 includes second wires 3202 which is formed along the second direction (D2) and spaced at intervals, and at least one first wire 3201 which is formed along the first direction (D1) and electrically connected with the second wires 3202. As the embodiments shown in FIGS. 3A and 3B, the first electrode blocks 310 and the second electrode blocks 320 have the similar structure. The second electrode line 32 further includes fourth wires 3203, and every fourth wire 3203 is electrically connected with the second wires 3202 of the two adjacent second electrode blocks 320. Thus the two adjacent second electrode blocks 320 are conducted. It is noted that the second electrode block 320 preferably has rhombic or hexagonal (not shown) geometric contour.

Figure 4A:
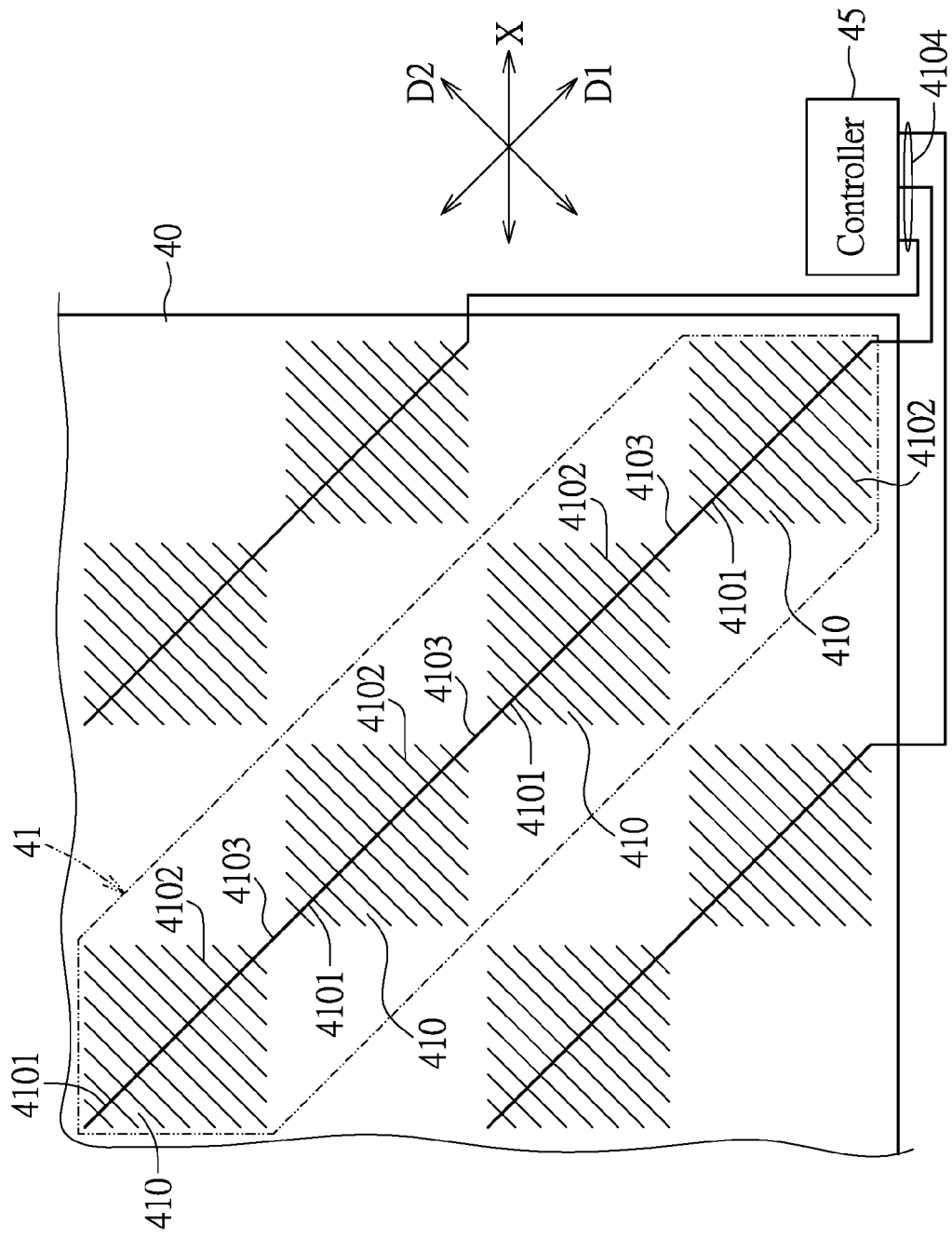
FIG. 4A schematically shows a first electrode layer of the touch panel in one embodiment of the present invention.
Figure 4B:
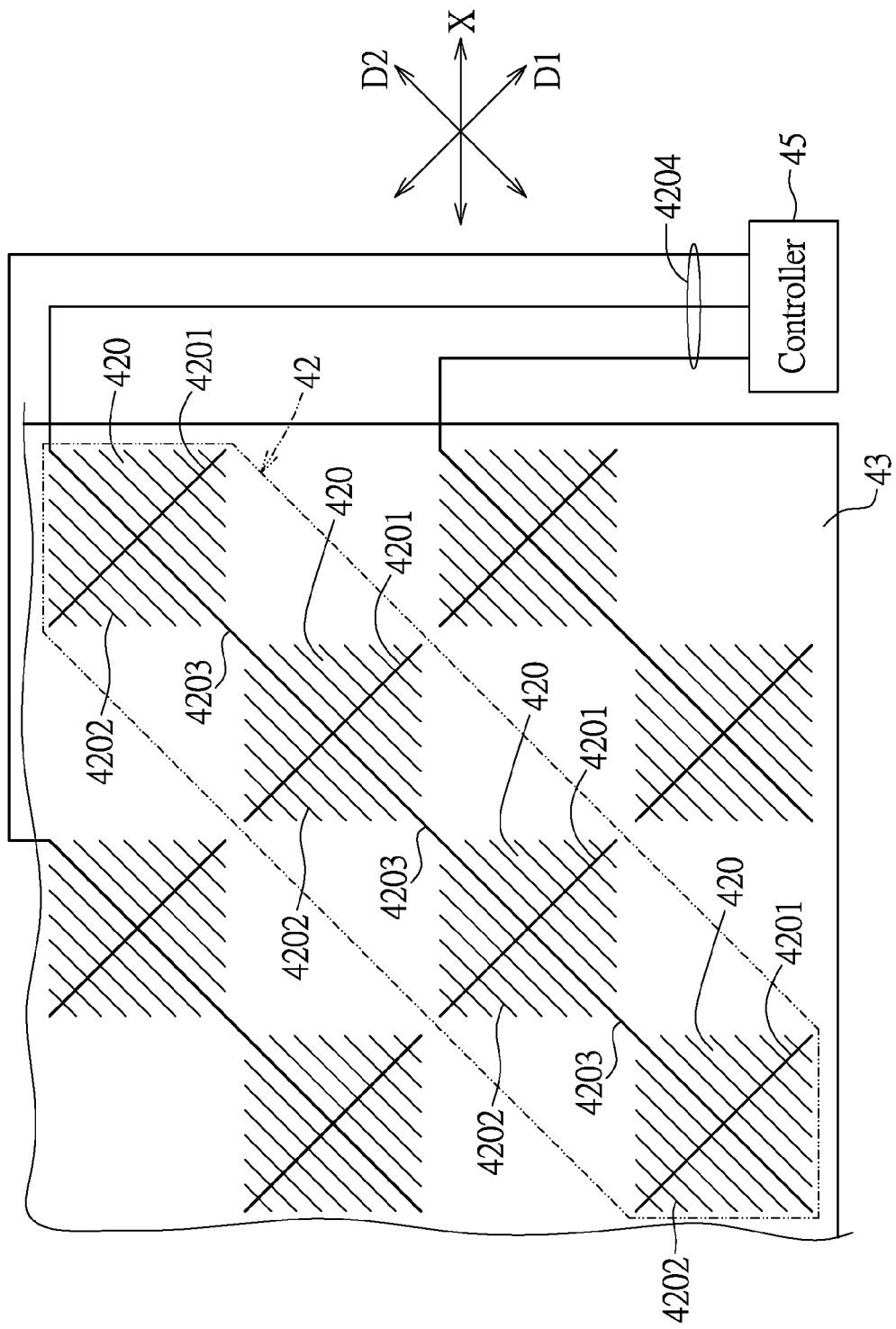
FIG. 4B schematically shows a second electrode layer of the touch panel in one embodiment of the present invention.
Figure 4C:
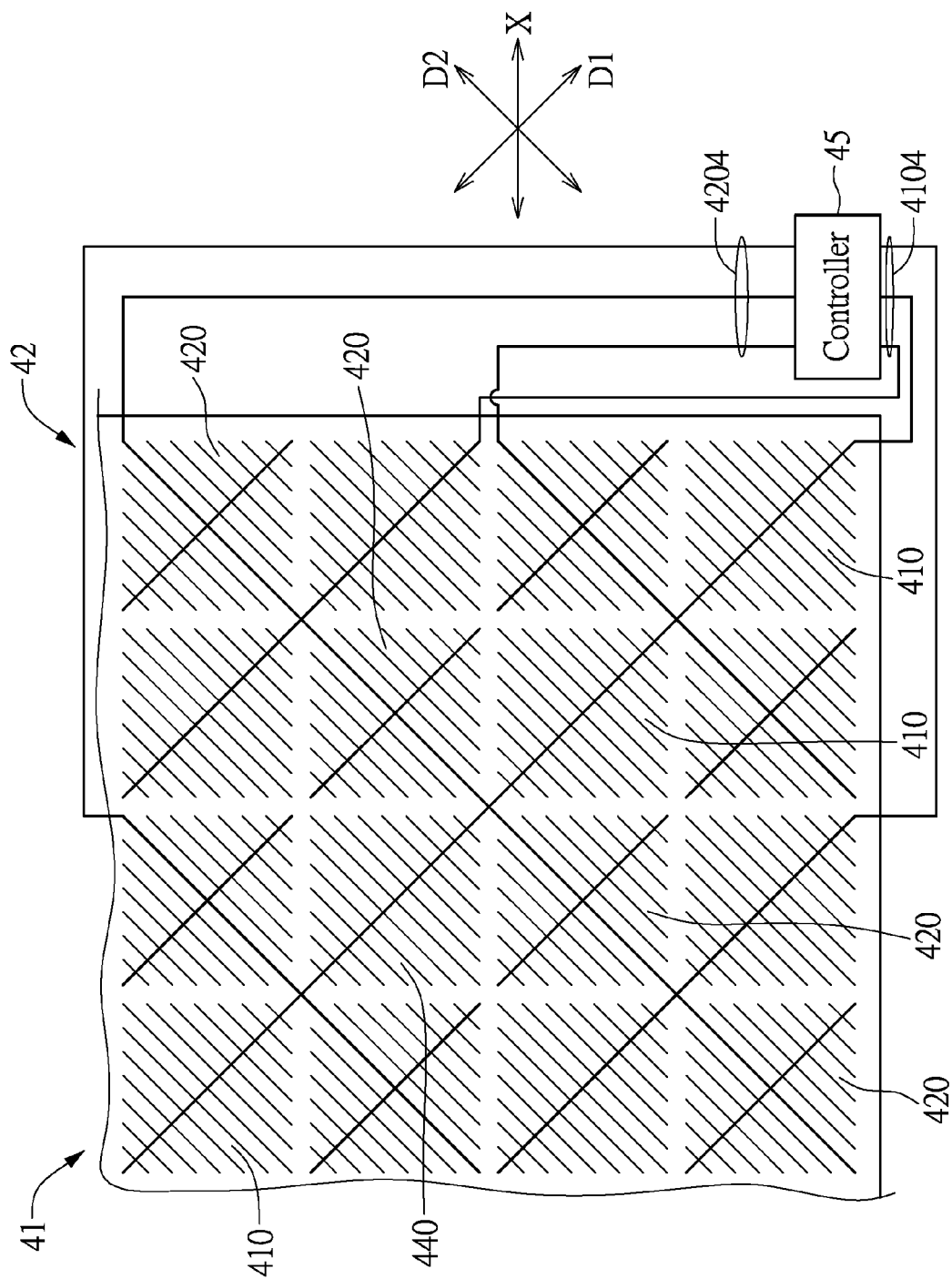
FIG. 4C schematically shows the touch panel including overlapped first electrode layer and second electrode layer in one embodiment of the present invention.

References are made to FIGS. 4A-4C describing a touch panel having the touch sensing electrode structure according to one preferred embodiment. In FIG. 4A, a first electrode layer within the touch panel is shown. The first electrode layer includes multiple first electrode lines 41 formed over a first transparent substrate 40 along the first direction (D1) and spaced at intervals. The every first electrode line 41 has multiple first electrode blocks 410 which are electrically interconnected and spaced at intervals. The every first electrode block 410 includes multiple second wires 4102 which are disposed along the second direction (D2) and spaced at intervals, and at least one first wire 4101 which is electrically connected to the second wires 4102 along the first direction (D1). Further, the every first electrode line 41 includes multiple third wires 4103. The third wire 4103 is used to electrically connect with the first wire 4101 which conducts the two adjacent first electrode blocks 410. Therefore, the adjacent first electrode blocks 410 are conducted. The every first electrode line 41 may therefore connect to with a control circuit 45 over a signal line 4104. The control circuit 45 is used to power these first electrode lines 41 and simultaneously to detect any touching event.

It is worth noting that, according to the preferred embodiment of the invention, the first electrode lines 41, the first wires 4101, and the second wires 4102 are atilt disposed relative to the horizontal direction (X). The atilt angle is around 30 through 60 degrees. This atilt angle may be able to restrain the optical interference stripes caused by the wires of the touch panel optically interact with the pixel electrodes of a display panel (not shown).

FIG. 4B shows the second electrode layer within the touch panel according to one of the embodiments. The second electrode layer includes multiple second electrode lines 42 disposed over a second transparent substrate 43 along the second direction (D2) and spaced at intervals. The second electrode line 42 also includes second electrode blocks 420 which are electrically interconnected and spaced from each other. The every second electrode block 420 includes multiple second wires 4202 which are paved over the second direction (D2), and spaced at intervals, and also at least one first wire 4201 electrically connected with the second wires 4202 along the first direction (D1).

Refer to the embodiments shown in FIGS. 4A and 4B, the first electrode block 410 and the second electrode block 420 have similar structure. As the figure shows, the second electrode line 42 also includes multiple fourth wires 4203. This fourth wire 4203 is electrically connected to the second wire 4202 which is used to conduct the two adjacent second electrode blocks 420. Therefore, the adjacent second electrode blocks 420 are conducted. The second electrode line 42 may therefore electrically connect with the control circuit 45 over a signal line 4204. The control circuit 45 is used to power these second electrode lines 42 and to detect any touching event.

According to the present embodiment, the second electrode lines 42, the first wires 4201, and the second wires 4202 are atilt disposed relative to the horizontal direction (X). In which, the related atilt angle is around 30 through 60 degrees. The design may effectively prevent the optical interference stripes caused by the wires within the touch panel optically interact with the pixel electrodes of a display panel (not shown).

FIG. 4C then shows a schematic diagram of the first electrode layer overlapping the second electrode layer within the touch panel. As the figure shows, the multiple second electrode lines 42 are insulated from and overlapped with the multiple first electrode lines 41. When the first electrode layer and the second electrode layer are stacked, the first transparent substrate 40 or the second transparent substrate 43 between the layers is used to insulate the first electrode line 41 from the second electrode line 42 since the first transparent substrate 40 or the second transparent substrate 43 is made of insulating materials. In detail, the second electrode line 42 and the first electrode line 41 may not be electrically conducted when they are isolated by inserting the first transparent substrate 40 or the second transparent substrate 43 between the first electrode layer and the second electrode layer within the touch panel. To compare the examples described in FIG. 1 and FIG. 4C, it is acknowledged that the touch sensing electrode structure in accordance with the present invention relatively simplifies the electrode structure and the fewer image sheltering area may enhance light transmittance.

Figure 5:
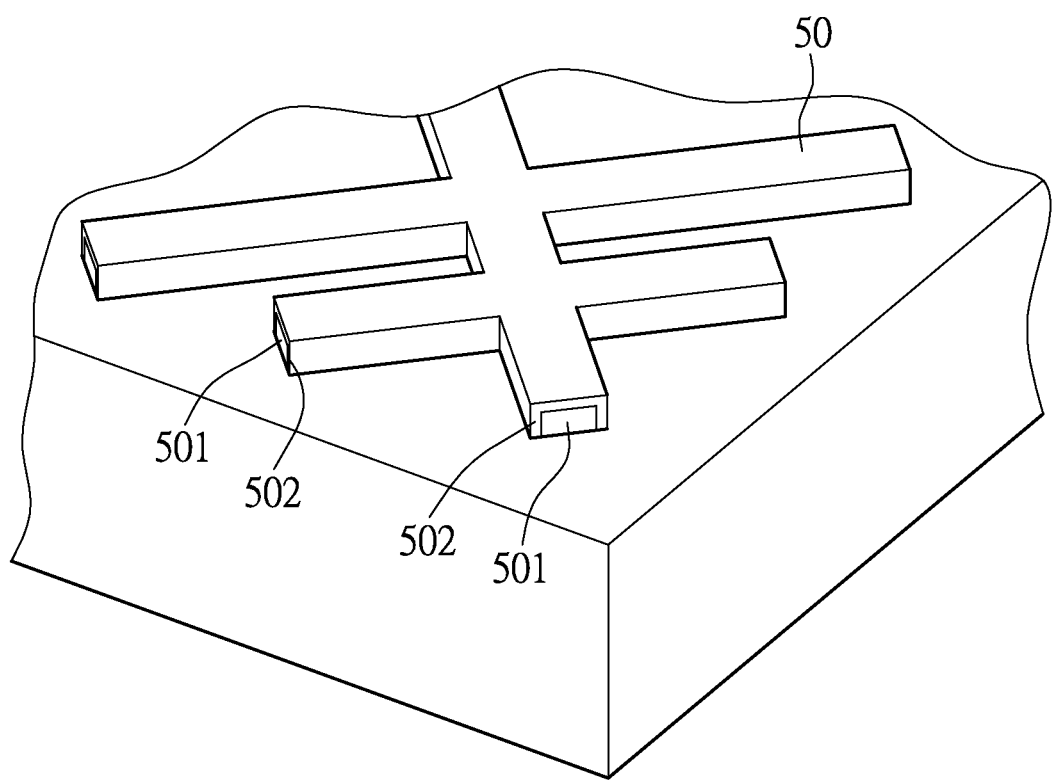
FIG. 5 shows the touch sensing electrode structure according to one of the embodiments of the present invention.

One further embodiment is shown in FIG. 5 which describes the touch sensing electrode structure in accordance with the present invention. The first wires and second wires of the touch sensing electrode structure may be formed from transparent conductive materials such as Indium Tin Oxide (ITO), or single-layer metal material such as copper, gold, silver, chromium, nickel, zinc, aluminum, tin, titanium, copper-nickel alloy, copper-chromium alloy, or copper-nickel-chromium alloy. The embodiment shown in the figure appears both the first wire and second wire may be made of a kind of double-layer metal material 50 which is with better corrosion resistance. It is noted that the double-layer metal material 50 is made of a copper bottom layer 501, and a coated layer 502 with the material selected from copper-nickel alloy, copper-chromium alloy, and copper-nickel-chromium alloy.

To sum up, the disclosure is related to a touch sensing electrode structure which is with high light transmittance. In which the first electrode block and the second electrode block may have rhombic or hexagonal geometric contour. The structure is adapted to a large touch sensing area. The relate touch panel provides high touching sensitivity and accuracy. Furthermore, the invention is provided to simplify the method of manufacturing the electrode structure, reduce cost, and with industrial application.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A touch sensing electrode structure, comprising:
   a plurality of first electrode lines spaced from each other and formed along a first direction, wherein over the first electrode line a plurality of electrically-connected first electrode blocks are formed and spaced at intervals;
   a plurality of second electrode lines spaced from each other and formed along a second direction, further insulated from and overlapped with the first electrode lines, wherein over the second electrode line a plurality of electrically-connected second electrode blocks are formed and spaced at intervals; and
   wherein, both the first electrode block and the second electrode block have the same configuration including a plurality of second wires spaced from each other along the second direction, and at least one first wire electrically connected with the second wires along the first direction
   wherein, the first electrode line, the second electrode line, the first wire, and the second wire are respectively atilt disposed with respect to a horizontal direction, along which pixel electrodes are arranged.

2. The electrode structure according to claim 1, wherein the first electrode line includes multiple third wires, and one of the third wires is electrically connected to the first wires of the two adjacent first electrode blocks.

3. The electrode structure according to claim 1, wherein the second electrode line includes multiple fourth wires, and one of the fourth wires is electrically connected to the second wires of the two adjacent second electrode blocks.

4. The electrode structure according to claim 1, wherein both the first electrode block and the second electrode block have rhombic or hexagonal geometric contours.

5. The electrode structure according to claim 1, wherein the first wire and the second wire are formed from transparent conductive material, single-layer metal material, or double-layer metal material.

6. The electrode structure according to claim 5, wherein the single-layer metal material is one selected from copper, gold, silver, chromium, nickel, zinc, aluminum, tin, titanium, copper-nickel alloy, copper-chromium alloy, and copper-nickel-chromium alloy.

7. The electrode structure according to claim 5, wherein the double-layer metal material is formed by a copper bottom layer, and a coated layer selected from copper-nickel alloy, copper-chromium alloy and copper-nickel-chromium alloy.

\* \* \* \* \*